Patented Mar. 6, 1951

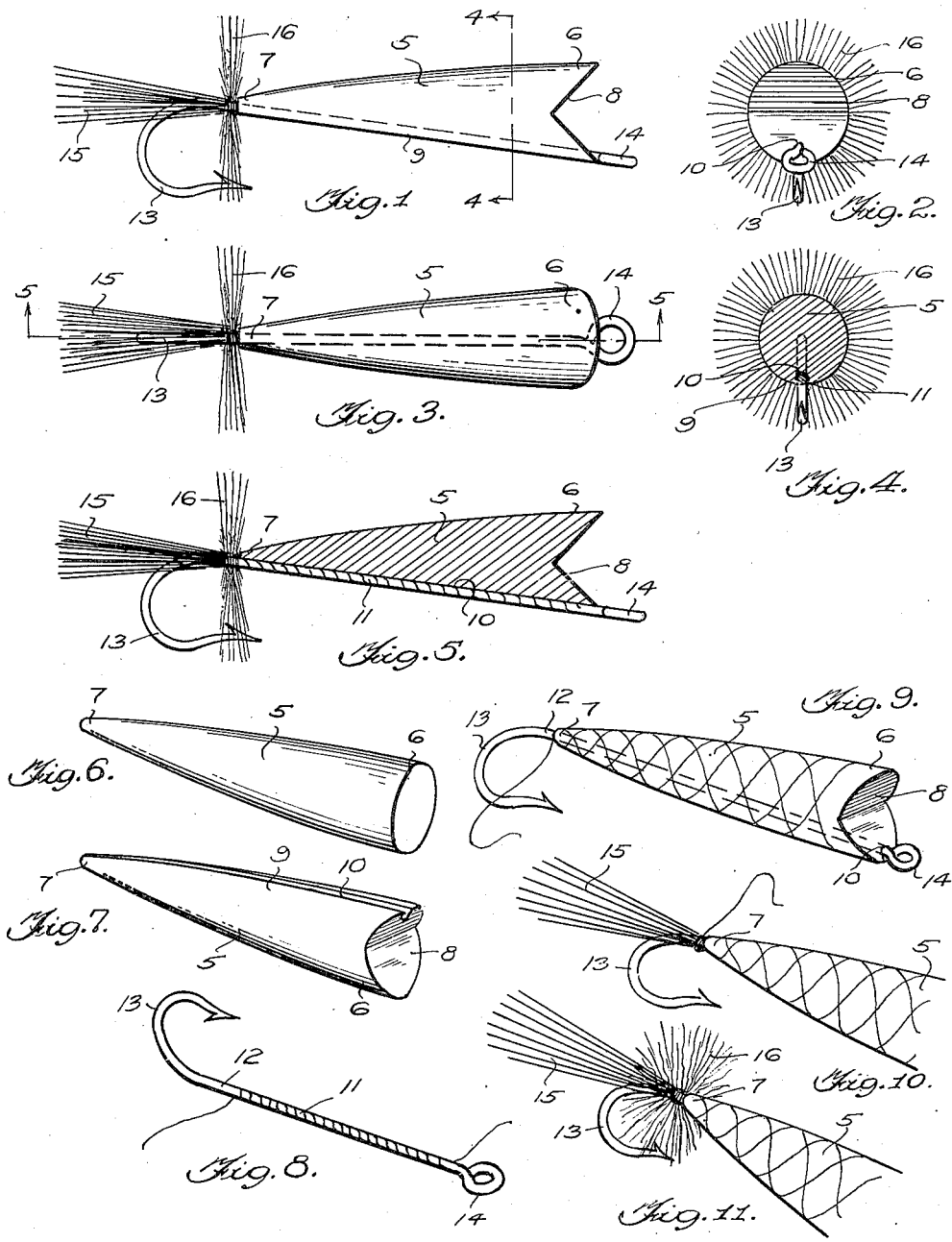

2,544,265

UNITED STATES PATENT OFFICE 2,544,265

METHOD OF MAKING FISH LURES

Cornelius S. Kelly and Elsie A. Kelly,
Hollywood, Fla.

Application March 18, 1949, Serial No. 82,096

2 Claims. (Cl. 43—42.53)

This invention relates to improvements in the method of making fish lures and has particular reference to the production of that type of lure generally recognized as casting plugs.

It is an object of the present invention to provide a casting plug constructed in a manner and form to simulate a fish or minnow and having characteristics that cause it to perform in a lifelike manner as a means to attract fish thereto.

A very important object of the invention resides in the novel manner of constructing and assembling the plug with a minimum of effort and cost.

Another object of the invention resides in the extreme simplicity of the device, is strong, durable and highly efficient in use.

Other important objects and advantages of the invention will readily present themselves during the course of the following description, reference being had to the accompanying drawing, wherein is shown a preferred embodiment of the invention.

Referring to the drawings:

Figure 1 is a side elevation of a casting plug constructed in accordance with the invention, Figure 2 is a head end view thereof, Figure 3 is a top plan view thereof, Figure 4 is a transverse section, taken on line 4—4 of Figure 1, Figure 5 is a partial longitudinal section, taken on line 5—5 of Figure 3, Figure 6 is a perspective view of a plug representing the first stage of forming the lure, Figure 7 is a similar view with the plug grooved and cut to form the mouth, Figure 8 is a perspective view of a hook, illustrating the manner of preparation prior to mounting in the plug, Figure 9 is a perspective view of the plug with the assembled hook in position.

Figure 10 is a fragmentary perspective view of the tail end of the plug, illustrating the mounting of the tail feathers, and Figure 11 is a fragmentary perspective view illustrating the mounting of the hackle.

Like numerals are employed to designate like parts throughout the several views of the drawings.

Referring specifically to the drawings, the numeral 5 designates the body of the plug, of conical form, having a head portion 6 and a tail portion 7. The plug is turned on a lathe, from a suitable strip of material, square in cross-section, to a form illustrated in Figure 6. The head portion 6 is cut inwardly in a V-shape, as at 8, to form a mouth. The belly 9, is grooved longitudinally, as at 10, to form a channel for the reception of the shank 11, of a metal hook 12, having its rear end hooked and barbed at 13 and its forward end provided with a line attaching eye 14. The shank 11 is secured in the groove 10, in a manner to be presently described. The groove 10 is of a depth to completely house the shank 11. Tail feathers 15 are secured to the shank 11 at the terminal end of the tail portion 7 and a hackle 16 is then mounted over the shank 11 at the terminal end of the tail 7, in a manner to be presently described.

As heretofore noted, the body 5 is formed in a convenient manner, as by turning upon a lathe, from wood or other suitable material, after which, the body is grooved throughout its length, as at 10 and the mouth 8 cut therein, as in Figure 7. The hook 12, of conventional form is then wound with a suitable thread, as in Figure 8 and coated with cement. After the hook has been coated with the cement, it is placed in the groove 10 and the thread is then wrapped back and forth about the body 5, as shown in Figure 9. It will be observed, that the eye 14 extends forwardly of the lower lip portion of the mouth 8, while the hooked and barbed end projects beyond the tail portion 7, with the end 13 positioned in a vertical manner with respect to the plug, as shown. The tail feather is then engaged with the rear extension of the shank 11 and wrapped with the free end of the thread and cemented. The tail feather 7 extends rearwardly of the plug and in axial alignment therewith. The hackle 16 is then wound about the shank 11 adjacent the tail portion 7 with the thread, after which, cement is applied to the winding upon the shank and the end of the thread clipped short. Upon drying of the cement, the body 5 is suitably painted in various colors and combinations to simulate various types of minnows, with the mouth 8 usually painted red. The plug is used in a well known manner.

It will be seen from the foregoing, that a very novel form of plug has been provided. The method of construction permits of rapid forming and assembly. The body may be formed from a strip squared to proper dimensions and cut into suitable lengths prior to turning, thus greatly facilitating the manufacture thereof. The application of the hook, tail feather and hackle are simple and novel to perform, lending speed in the manufacture of the device. The device is exceedingly strong, natural in appearance and performs in the water in a manner accurately simulating a live bait. The plug readily lends itself to manufacture in varying sizes.

It is to be understood, that the invention is not limited to the production of the precise arrangement shown, but that it includes within its purview, whatever changes fairly come within either the terms or the spirit of the appended claims.

Having described our invention, what we claim is:

1. The method of forming a fishing lure which consists of forming a body portion of conical shape, grooving the body throughout its length, of cutting a V-shaped mouth in one end of the body, wrapping a hook shank with thread and coating with cement, setting the coated shank within the groove prior to the setting of the cement, of passing the thread from the shank about the body of the lure in a continuous wrapping back and forth, of placing one end of a tail feather upon the shank adjacent the end of the lure body opposite to the mouth, of wrapping the feather upon the shank with the thread and cementing and then wrapping a hackle upon the shank, wrapping the thread about the hackle and cementing the hackle and its thread wrapping.

2. The method of forming a fishing plug which consists of first forming a body portion of conical shape having a head and a tail, second, grooving the body throughout its length with the groove open at each end to the extremity of the body, third, cutting a V-shaped notch in the head end to form a mouth, fourth, providing a hook device having a shank with an eye at one end and a curved barbed end at its opposite extremity, fifth, wrapping the shank of the hook device with thread and coating with cement, sixth, setting the wrapped and coated shank within the groove of the body with the eye projecting beyond the mouth and the barbed end projecting beyond the tail, seventh, wrapping the extended end of the thread about the body back and forth, eighth, placing the end of a tail feather upon the shank at a point adjacent the tail of the body, ninth, wrapping the extended thread about the feather and shank and cementing the thread and feather to the shank, tenth, winding a hackle feather about the shank adjacent the tail of the body, eleventh, wrapping the extended end of the thread about the hackle and the shank and cementing the winding and, twelfth, coating the body of the plug and its wrappings with a decorated paint finish.

CORNELIUS S. KELLY.
ELSIE A. KELLY.

REFERENCES CITED

The following references are of record in the file of this patent:

UNITED STATES PATENTS

| Number | Name | Date |
| --- | --- | --- |
| 1,257,008 | McCarthy | Feb. 19, 1918 |
| 1,640,599 | Conn | Aug. 30, 1927 |
| 1,900,832 | Martin | Mar. 7, 1933 |
| 1,949,582 | Pott | Mar. 6, 1934 |
| 2,082,305 | Strong | June 1, 1937 |
| 2,119,417 | Brown | May 31, 1938 |
| 2,148,799 | Bilinski | Feb. 28, 1939 |